(12) United States Patent
Amishav et al.

(10) Patent No.: US 10,044,816 B2
(45) Date of Patent: *Aug. 7, 2018

(54) LOCATION-BASED DOMAIN NAME SYSTEM SERVICE DISCOVERY

(71) Applicant: International Business Machines Corporation, Armonk, NY (US)

(72) Inventors: Yoni Amishav, Haifa (IL); Eric J. Barkie, Morrisville, NC (US); Oded Dubovsky, Haifa (IL); Benjamin L. Fletcher, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,881

(22) Filed: Feb. 14, 2017

(65) Prior Publication Data

US 2017/0155619 A1    Jun. 1, 2017

Related U.S. Application Data

(60) Division of application No. 13/969,769, filed on Aug. 19, 2013, which is a continuation of application No. 13/892,451, filed on May 13, 2013.

(51) Int. Cl.
    *H04L 29/08*      (2006.01)
    *H04L 12/24*      (2006.01)
    *H04L 29/12*      (2006.01)

(52) U.S. Cl.
    CPC .......... *H04L 67/16* (2013.01); *H04L 41/5058* (2013.01); *H04L 61/1511* (2013.01); *H04L 61/2015* (2013.01); *H04L 61/609* (2013.01); *H04L 61/6022* (2013.01)

(58) Field of Classification Search
    CPC ......... H04L 29/12047; H04L 29/12226; H04L 41/5058; H04L 61/15; H04L 61/1511; H04L 61/1541; H04L 61/2015; H04L 61/609; H04L 67/16
    See application file for complete search history.

(56) References Cited

U.S. PATENT DOCUMENTS

| | | | |
|---|---|---|---|
| 6,286,038 B1 * | 9/2001 | Reichmeyer | H04L 41/0213 709/220 |
| 7,864,709 B2 | 1/2011 | Cheshire | |
| 7,912,072 B1 | 3/2011 | Boswell | |
| 8,239,549 B2 * | 8/2012 | Aura | H04L 61/2015 709/228 |

(Continued)

OTHER PUBLICATIONS

Aitchison, "Pro DNS and BIND 10", Apress, 2011, pp. 23-39, 41-62, and 483-551.*

(Continued)

*Primary Examiner* — Vivek Srivastava
*Assistant Examiner* — William C McBeth
(74) *Attorney, Agent, or Firm* — Louis J. Percello; Ryan, Mason & Lewis, LLP

(57) ABSTRACT

Systems and methods are provided for location-based Domain Name System (DNS) service discovery using a central DNS server in which network resources are aggregated by geographic location (e.g., subnets) and defined using DNS service discovery records that are mapped to corresponding geographic locations.

6 Claims, 5 Drawing Sheets

(56) References Cited

U.S. PATENT DOCUMENTS

| | | | |
|---|---|---|---|
| 2002/0099814 A1* | 7/2002 | Mastrianni | H04L 29/12009 709/224 |
| 2003/0163341 A1* | 8/2003 | Banerjee | H04L 61/2015 709/230 |
| 2005/0055575 A1* | 3/2005 | Evans | H04L 41/0809 726/4 |
| 2005/0097610 A1* | 5/2005 | Pedlow, Jr. | H04N 7/16 725/80 |
| 2005/0113109 A1* | 5/2005 | Adrangi | H04L 63/0272 455/456.1 |
| 2006/0161663 A1* | 7/2006 | Palm | H04L 47/15 709/227 |
| 2006/0242260 A1* | 10/2006 | Sakou | H04L 61/2076 709/217 |
| 2008/0307079 A1* | 12/2008 | Choi | H04L 29/12358 709/223 |
| 2010/0303003 A1 | 12/2010 | Park et al. | |
| 2010/0306409 A1 | 12/2010 | Jansen et al. | |
| 2010/0312875 A1* | 12/2010 | Wilerson | H04L 61/1511 709/224 |
| 2011/0002429 A1 | 1/2011 | Williams et al. | |
| 2011/0149806 A1 | 6/2011 | Verma et al. | |
| 2011/0216753 A1 | 9/2011 | Kneckt et al. | |
| 2012/0036233 A1 | 2/2012 | Scahill et al. | |
| 2012/0233305 A1* | 9/2012 | Yoshikawa | G06F 9/5055 709/223 |
| 2012/0317254 A1 | 12/2012 | Chekhanovskiy et al. | |
| 2014/0214958 A1 | 7/2014 | Cheshire | |
| 2014/0269703 A1 | 9/2014 | Sundaresan et al. | |
| 2014/0344475 A1* | 11/2014 | Chen | H04L 61/2015 709/245 |
| 2015/0237003 A1* | 8/2015 | Ghai | H04L 61/2015 709/220 |

OTHER PUBLICATIONS

Droms, "Automated Configuration of TCP/IP with DHCP", IEEE Internet Computing, vol. 3, No. 4, Jul.-Aug. 1999, pp. 45-53.*
Infoblox, "Danone Case Study," http://www.infoblox.com/content/dam/infoblox/documents/case-studies/infoblox-case-study-danone.pdf, Jul. 2010; 2 pages.
Ashish, "Airprint Across Subnets," http://sites/google.com/site/iwastepaper/, Apr. 2011, 3 pages.
Geordie Korper, "Using Bonjour Across Subnets," http:/www.grouplogic.com/Knowledge/PDFUpload/Info/WanBonjour_1.pdf, Sep. 2006, 9 pages.
H. Lundqvist et al., "Service Program Mobility—Dynamic Service Roaming," IEEE Workshop on Mobile Computing and Emerging Communication Network, Dec. 2011, pp. 538-542.
MAC Developer Library, "Bonjour Overview: Introduction to Bonjour," https://developer.apple.com/library/mac/#documentation/Cocoa/Conceptual/NetServices/Introduction.html#/apple_ref/doc/uid/TP40002445-SW1, Apr. 2013, 7 pages.
Cheshire et al., "DNS-Based Service Discovery," Internet Engineering Task Force RFC 6763, Feb. 2013.

* cited by examiner

LOCATION-BASED DOMAIN NAME SYSTEM SERVICE DISCOVERY

TECHNICAL FIELD

The field generally relates to systems and methods for location-based network service discovery and, more specifically, systems and methods for providing location-based Domain Name System (DNS) service discovery using a central DNS server in which network resources are aggregated by geographic location (e.g., subnets) and defined using DNS service discovery records that are mapped to corresponding geographic locations.

BACKGROUND

As is known in the art, DNS is a hierarchical distributed naming system that is used for naming computers, services, and resources on a communications network such as the Internet or a private network. Various types of DNS service discovery protocols have been developed to enable network devices to discover shared computing resources on a computer network. For example, Multicast DNS (mDNS) is a protocol that allows network devices operating on a small network to automatically communicate with each other and share information regarding network computing resources without utilizing a central DNS server. When a network device joins a network, it "announces" its presence in the form of an mDNS multicast query to a range of Internet Protocol (IP) addresses on a local network. When an mDNS query is broadcast, other network devices on the local network will receive the announcement and store it in their mDNS cache. An mDNS announcement includes an IP address of the network device as well as a list of shared network services provided by the network device. These services can include printing services, shared file folders, iTunes music repositories, projectors, or any number of other network services and resources. The mDNS protocol enables the formation of ad hoc networks of computers and network services without the need for the network devices to be manually configured by device users, since the network devices share their services and information with each other automatically.

One disadvantage to the mDNS protocol is that the range of an mDNS multicast query is limited to a "link-local" network (or subnetwork) that the network device is located on. In general, a "link-local" network refers to a segment of a network in which network devices can exchange packets without IP header data being modified. In practice, a "link-local" network consists of all devices connected to the same network router, as a network router does not forward packets with link-local addresses. As such, the range of an mDNS multicast query is limited to the broadcast range of a single network router. However, in an alternative implementation using mDNS multicast groups, for example, network routers can be configured to transmit mDNS broadcasts between subnetworks. However, these configurations must be manually applied to each router, which can be impractical for large networks with many routers and subnetworks.

Moreover, with mDNS protocols, another disadvantage is that the network devices must periodically "push" a network service announcement to the broadcast domain, which is then pushed to all network devices on the broadcast domain. The broadcast domain does not respond to service requests—it only pushes service request to network devices. Depending on the size of the local network, this type of "blind advertisement" of network information can generate a lot of network traffic, resulting in a serve drain on network resources and bandwidth as every request must be transmitted to every device on the network. This is problematic for mobile phones, for example, which must continuously power-up and power-down to receive and transmit the mDNS broadcasts. The result is a limitation on the number of devices that can be on a signal broadcast domain.

One alternative to the mDNS protocols includes a Wide Area Broadcast DNS service discovery (WAB DNS-SD) protocol in which a list of network services is defined on a central DNS server. Instead of blindly "pushing" network service information across networks as with the mDNS protocols, the WAB DNS-SD protocol allows network devices to "pull" network service information from the central DNS server on demand. The WAB DNS-SD protocol enables network devices on any subnetwork to query the central DNS server to obtain network service information. However, with WAB DNS-SD, the network devices must be manually configured to query the DNS server for service information, as compared to the mDNS protocols which automatically discover services on a subnetwork through mDNS broadcasts. Moreover, while WAB DNS-SD enables service discovery across subnetworks, the WAB DNS-SD protocol is not "subnetwork aware" in that the protocol eliminates the location specificity of mDNS broadcasts. In other words, the WAB DNS-SD protocol does not provide the granular location specificity which is desirable for location-specific network devices such as printers, for example. In particular, a shared network service like a printer would only be useful to users that are physically located near the printer.

SUMMARY

Embodiments of the invention generally include systems and methods for location-based network service discovery and, more specifically, systems and methods for providing location-based DNS service discovery using a central DNS server in which network resources are aggregated by geographic location (e.g., subnets) and defined using DNS service discovery records that are mapped to corresponding geographic locations.

In one embodiment of the invention, a method is implemented by a computing device to access resources on a network. The computing device receives a subnetwork address of a subnetwork in which the computing device is located in a computer network. The computing device generates a query comprising the subnetwork address. The computing device submits the query to a central DNS server to obtain network service records of computing resources that are available in the subnetwork. The computing device receives one or more network service records from the central DNS server, and then processes the one or more received network service records to access one or more computing resources that are available in the subnetwork.

In another embodiment of the invention a method is implemented by a by a DNS server to enable access to resources on a network. The DNS server receives a query from a computing device requesting network service records for computing resources that are available in a subdomain of a network in which the computing device is operating. The query includes information identifying the subdomain. The DNS server accesses DNS records to retrieve one or more network service records associated with the subdomain of the network, based on the information identifying the subdomain in the query. The DNS server returns the retrieved network service records to the computing device.

In another embodiment of the invention, a method is provided for accessing resources on a network. The method includes receiving, by a DHCP (Dynamic Host Configuration Protocol) server, a broadcast query from a computing device requesting information to connect to a network. The DHCP server determines a subnetwork of the computing device within the network. The DHCP server accesses records that map the determined subnetwork of the computing device to a subdomain name, and then sends network connectivity information to the computing device. The network connectivity information includes the subdomain name that is mapped to the determined subnetwork of the computing device. In another embodiment, the computing device submits the subdomain name in a forward DNS lookup query to a central DNS serve to obtain network service records of computing resources that are associated with the subdomain name. The computing device receives one or more network service records from the central DNS server, and processes the one or more received network service records to access one or more computing resources associated with the subdomain name.

These and other embodiments of the invention will be described or become apparent from the following detailed description of embodiments, which is to be read in conjunction with the accompanying drawings.

DETAILED DESCRIPTION

Figure 1:
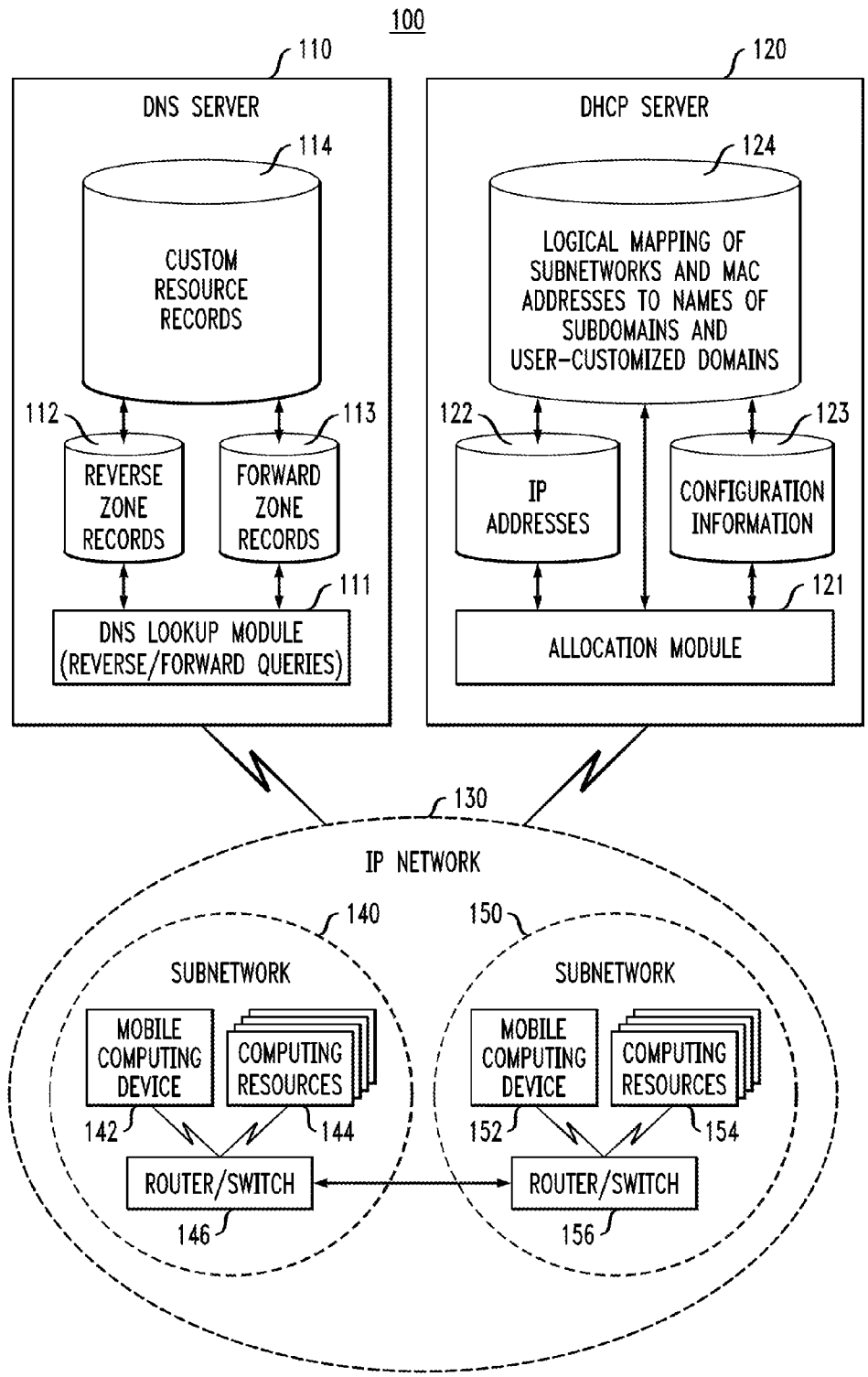
FIG. 1 is a block diagram of a system for providing location-based network service discovery according to an embodiment of the invention.

Embodiments of the invention will now be described in further detail with regard to systems and methods for providing location-based DNS service discovery using a central DNS server in which network resources are aggregated by geographic location (e.g., subnets) and defined using DNS service discovery records that are mapped to corresponding geographic locations. For example, FIG. 1 is a high-level block diagram of a system for providing location-based network service discovery according to an embodiment of the invention. In general, a system 100 shown in FIG. 1 includes a DNS server 110, a DHCP (Dynamic Host Configuration Protocol) server 120, and a computer network 130 that is divided into a plurality of subnetworks 140 and 150. The DNS server 110 comprises a DNS lookup module 111, a database of reverse zone records 112, a database of forward zone records 113, and a database of custom resource records 114. The DHCP server 120 comprises an allocation module 121, a database of IP addresses 122, a database of configuration information 123, and a mapping records database 124 having data records that logically map the subnetworks 140, 150 and device MAC (Machine Access Control) addresses of computing devices in the computer network 130 to subdomain names and/or user-customized domain names.

In one embodiment of the invention, the computer network 130 may be any type of IP network, such as a LAN (Local Area Network), a WAN (Wide Area Network), a WLAN (wireless LAN), a VPN (Virtual Private Network), etc. For ease of illustration, FIG. 1 shows the computer network 130 divided into two subnetworks (or "subnets"), including a first subnetwork 140 and a second subnetwork 150, although it is to be understood that the computer network 130 can be divided into three or more subnets. For example, the computer network 130 may represent the entire domain of a given organization or company (e.g., company.com) wherein each subnetwork 140 and 150 of the computer network 130 represents a different building or site location of the company (e.g., location1.company.com and location2.company.com) or different portions of the computer network 130 that are administratively controlled by different entities of the organization, etc. The subnets can be logically arranged in any manner (e.g., hierarchical arrangement) which is suitable for the given network deployment needs. Techniques for subnetting are well-known to those of ordinary skill in the art and, thus, a detailed discussion is not necessary herein.

As generally shown in FIG. 1, the first subnetwork 140 comprises a mobile computing device 142, a plurality of computing resources 144, and a router/switch 146. Similarly, the second subnetwork 150 comprises a mobile computing device 152, a plurality of computing resources 154, and a router/switch 156. The mobile computing devices 142, 152 may be any type of portable computing device such as smart phones, laptop computers, hand-held PDA (personal digital assistant) devices such as electronic tablets, etc. The computing resources 144, 154 may be computing devices such as desktop computers, network printers, video conferencing devices, external storage devices, and other non-portable or portable computing devices. The router/switches 146 and 156 represent logical or physical boundaries between the first and second subnetworks 140 and 150. The router/switches 146 and 156 operate to exchange and route network traffic between the subnetworks 140 and 150, and exchange and route network traffic between computing devices within respective subnetworks 140 and 150.

In accordance with embodiments of the invention, the DNS server 110 and the DHCP server 120 are configured to implement location-based DNS service discovery methodologies in which network resources are aggregated by geographic location (e.g., subnets) and defined using DNS service discovery records that are mapped to corresponding geographic locations. For instance, in one embodiment of the invention, the system 100 implements a location-based network service discovery protocol in which a computing device uses a subnet address to query the DNS server 110 to obtain a geo-specific list of resource records based on the subnetwork in which the computing device is operating. In general, with this service discovery protocol, a computing device seeking access to the computer network 130 receives network connectivity information from the DHCP Server 120, wherein the network connectivity information includes a subnetwork mask of a current subnetwork (e.g., subnetwork 140 or 150) in which the computing device is located. To obtain network service information of other computing resources in the current subnetwork, the computing device generates a query using the subnetwork address (subnetwork mask) received from the DHCP server 120, and submits the query to the DNS server 110 in the form of a reverse DNS lookup query. The DNS lookup module 111 receives the query and accesses the reverse zone records database 112 and custom resource records database 114 to process the query and return a geo-specific list of resource records of computing resources that are available to the computing device in the current subnetwork in which the computing device is located.

The custom resource records database 114 comprises a plurality of custom DNS records that describe computing resources in the computer network. In one embodiment, each custom DNS record is a text record that describes key resource attributes of a given computing resource. For example, in one embodiment, each custom DNS record has the following general format:

_custom._type. IN TXT ("custom attribute=val")

In this example format, the terms "custom" and "type" respectively denote a custom name given to a computing resource and the type of computing resource. The terms "IN" and "TXT" respectively denote a DNS class of record and that the record is a "text" type record. The "custom attribute" and "value" denote a given attribute of the computing resource and its attribute value. For example, for a printer device, the _custom._type portion of the custom DNS record can be, e.g., accounting_networkprinter, which defines a network printer in an accounting department of a given site location, wherein the associated "custom attributes" may specify various characteristics/capabilities of the printer such as color, memory, drivers, text, raster, and vector printing capabilities, etc.

The reverse zone records database 112 comprises a plurality of custom reverse zone records, wherein each reverse zone record associates at least one subnet address to a list of one or more of the custom DNS records in the records database 114. For example, in one embodiment, for IPv4, each reverse zone record has the following general format:

zone "subnet.in-addr.arpa" {list definition} wherein the term "zone" denotes the name of the given reverse zone (subnet) for a computer network, the term "subnet" denotes octets of a subnet address in reverse order, the term "in-addr.arpa" represents the in-addr.arpa domain (where a reverse DNS database of the Internet is rooted in the Address and Routing Parameter Area (area) top-level domain of the Internet), and wherein the "{list definition}" specifies a list of one or more custom DNS records (in the records database 114) that are associated with the subnetwork defined by the reverse zone record. The ip6.arpa domain is delegated for Internet Protocol Version 6 (IPv6).

Each reverse zone record within the database 112 on the DNS sever 110 defines a given subnetwork (e.g., subnet 140 and 150) within a given computer network (e.g., network 130). Each reverse zone records is a parent record, with one or more custom DNS records as child records that are specified by the "{list definition}" for the given parent reverse zone record. A subnetwork is, by definition, a range of IP addresses. Therefore, in accordance with an embodiment of the invention. a reverse zone record is specified for each subnet (range of IP addresses) of a given computer network, and a plurality of custom DNS resource records are associated with the given reverse zone record, wherein the custom DNS resource records correspond to computing resources having IP addresses that fall within the range of IP addresses specified for the corresponding subnet.

For example, the following reverse zone record:

zone "111.111.11.in-addr.arpa" {list definition} denotes a zone for a given subnetwork (i.e., 11.111.111) that is specified for a range of IP addresses between 11.111.111.1 to 11.111.111.254 for subnet mask 255.255.255.0. In this manner, the reverse zone records allow the computing resources in a given computer network to be assigned based on geolocation (subnetworks). A computing device will use a subnet address (of the subnetwork in which it is currently located) to query the DNS server 110 for records of "_custom._type" that are specified as child records of a given reverse zone record corresponding to the subnet address, and the DNS server 110 will return a geo-specific list of resource records to the computing device.

In another embodiment of the invention, the system 100 implements a location-based network service discovery protocol in which a computing device uses a subdomain name assigned by the DHCP server 120 to query the DNS server 110 to obtain a geo-specific list of resource records that are mapped to the assigned subdomain name. In general, with this service discovery protocol, a computing device seeking access to the computer network 130 receives a custom subdomain name from the DHCP server 120 based on a determined location (subnetwork) of the computing device. In one embodiment of the invention, the mapping records database 124 of the DHCP server 120 maps each of a plurality of subnetworks to one or more custom subdomain names that are provided by the DHCP server 120 to a given computing device. The computing device will use the one or more custom subdomain names provided by the DHCP server 120 as search domains to access custom resource records in the database 114 of the DNS server 110, and thereby obtain network service information for other computing resources that are located within the one or more subnetworks that are associated with the custom subdomain name(s).

More specifically, in one embodiment of the invention, to obtain network service information of other computing resources in the current subnetwork, a computing device generates a query using a subdomain name received from the DHCP server 120 and submits the query to the DNS server 110 in the form of a forward DNS lookup query. The DNS lookup module 111 receives the query and accesses the forward zone records database 113 and custom resource records database 114 to process the query and return a geo-specific list of resource records of computing resources that are associated with the given subdomain name.

The forward zone records database 113 comprises a plurality of custom forward zone records, wherein each forward zone record associates a subdomain name to a list of one or more custom DNS records in the records database 114. For example, in one embodiment, each forward zone record has the following general format:

zone "subdomain_name" {list definition} wherein the term zone denotes the name of the given forward zone record associated with a given subdomain_name that corresponds to one of the custom subdomain names defined in the mapping records database 124 of the DHCP server 120. The {list definition} specifies a list of one or more custom DNS records (in the records database 114) that are associated with the subdomain_name specified by the forward zone record. In this manner, the forward zone records in the database 113 allow computing resources in a given computer network to be assigned to custom subdomain names which are used to query the DNS server 110 for records of _custom._type. that are specified as child records of a given forward zone record corresponding to the custom subdomain name. The DNS server 110 will return a geo-specific list of resource records to the computing device based on the custom subdomain name(s) included in the forward DNS lookup query.

In yet another embodiment of the invention, the system 100 implements a location-based network service discovery protocol in which one or more custom subdomain names are assigned by the DHCP server 120 based on a determined location (subnetwork) of the computing device as well as a MAC (machine access control) address of the computing device. With this protocol, the DHCP server 120 determines the MAC address of the computing device as well as the subnetwork in which the computing device is located in the computer network. The DHCP server 120 accesses the mapping records database 124 to identify one or more subdomain names that are mapped to the given MAC address or a combination of the MAC address and the determined subnetwork.

Figure 2:
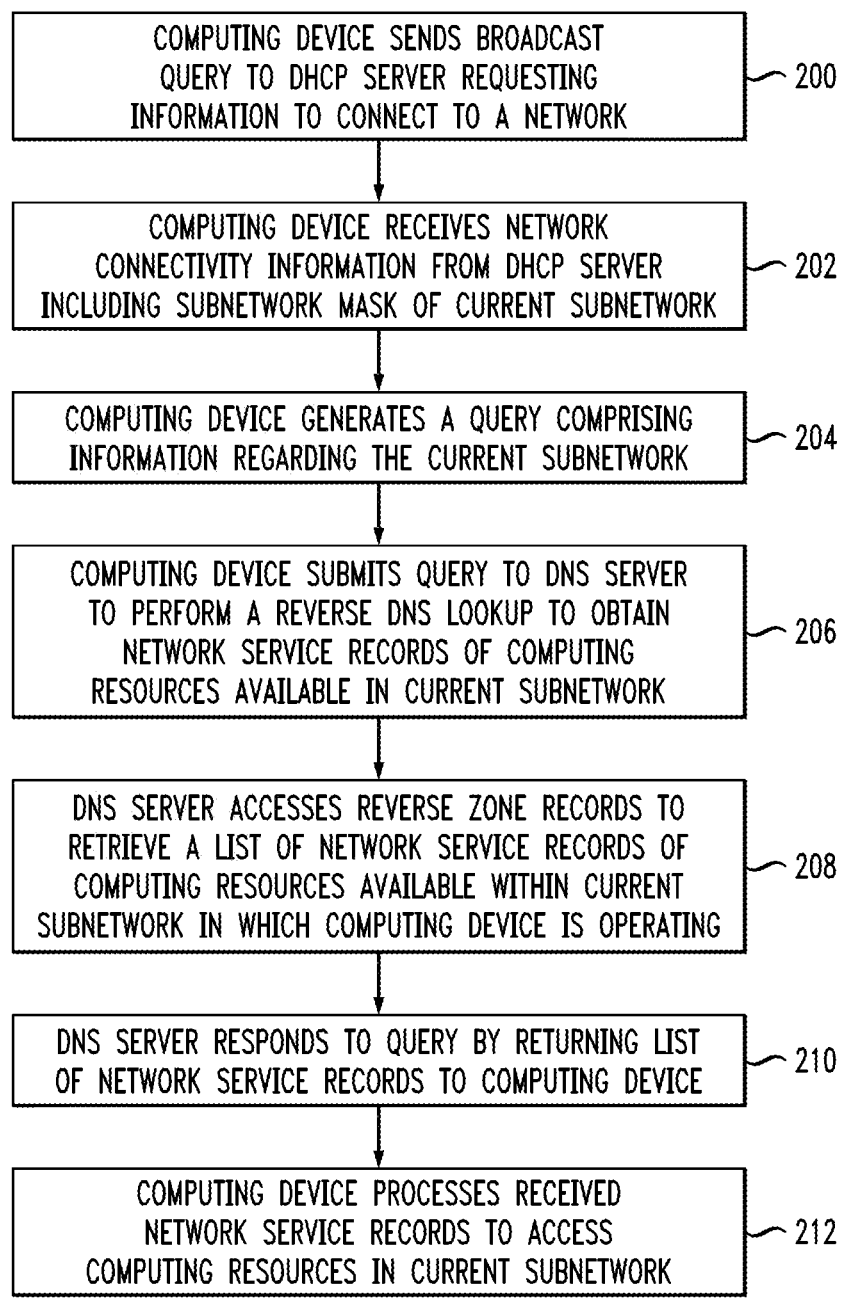
FIG. 2 is a flow diagram of a method for providing location-based network service discovery according to an embodiment of the invention.

Exemplary operating modes of the system 100 of FIG. 1 for providing location-based network service discovery according to embodiments of the invention will now be discussed in further detail with reference to methods depicted in FIGS. 2, 3 and 4. FIG. 2 is a flow diagram that illustrates a method for providing location-based network service discovery in which a computing device uses a subnet address to query the DNS server 110 to obtain a geo-specific list of resource records based on the subnetwork in which the computing device is operating. For purposes of illustration, assume that a user of the computing device 142 is seeking access to the computer network 130 and, in particular, the first subnetwork 140. Referring to FIG. 2, when the computing device 142 first connects to the network 130, a DHCP client of the computing device 142 will send a broadcast query requesting network connectivity information to the DHCP server 120 (block 202). The DHCP server 120 maintains a database 122 of available IP addresses and a database 123 of configuration information. When the DHCP server 120 receives the request from the computing device 142, the DHCP server 120 determines the network to which the computing device 142 is connected (e.g., computer network 130), and then allocates an appropriate IP address for the computing device 142, and sends other IP configuration information such as a domain name of the computer network 130, a subnetwork mask, a default gateway, a DNS server name, and other configuration information that is typically provided by a DHCP server. Once the computing device 142 receives the network connectivity information (including the subnetwork mask) from the DHCP server (block 202), the computing device 142 will process the network connectivity information and implement the configuration settings so that the computing device 142 is able to communicate on the computer network 130.

Next, the computing device 142 will generate a query that comprises information regarding the current subnetwork (e.g., subnetwork 140) in which the computing device is located within the IP network 130 (block 204). The subnet mask provided by the DHCP server 120 defines a subnetwork (e.g., subnetwork 140) within a larger network (e.g., network 130). In one embodiment of the invention, the computing device 142 generates a DNS query by converting the received subnetwork mask into a CIDR (Classless Inter-Domain Routing) address and generating a reverse DNS lookup request based on the CIDR address. As is known in the art, CIDR is basically a bitwise, prefix-based standard for specifying IP address and their associated routing prefix. For example, for the Internet Protocol Version 4 (IPv4), CIDR appends to the IP address a slash character (/) followed by a decimal number n of leading bits of a routing prefix, e.g., a.b.c.d/n, wherein a.b.c.d denotes the IP address in a quad-dotted decimal format and n is the prefix length (number of shared initial bits counting from the most significant bit of the address).

Next, the computing device 142 submits the query to the DNS server 110 to perform a reverse DNS lookup to obtain network service records of computing resources 144 available in the current subnetwork 140 (block 206). In response to the query, the DNS server 110 accesses the database of reverse zone records 112 to retrieve a list of network service records from the records database 114 for computing resources 144 that are available in the current subnetwork 140 in which the computing device 142 is operating (bock 208). In particular, in one embodiment of the invention, the DNS lookup module 111 receives the query, and uses the CIDR address (representing the subnet mask) to find the reverse zone record in the reverse zone records database 112 which corresponds to the subnet specified by the CIDR address. Once the corresponding reverse zone record is found, the DNS lookup module 111 will obtain list of one or more custom DNS resource records from the records database 114, which are specified as child records within the "list definition" portion of the reverse zone record, as discussed above.

Thereafter, the DNS server 110 responds the query by returning the list of network service records to the computing device 142 (block 210). The computing device 142 will then process the received network service records to access or more shared computing resources 144 that are available on the subnetwork 140 as desired (block 212).

Figure 3:
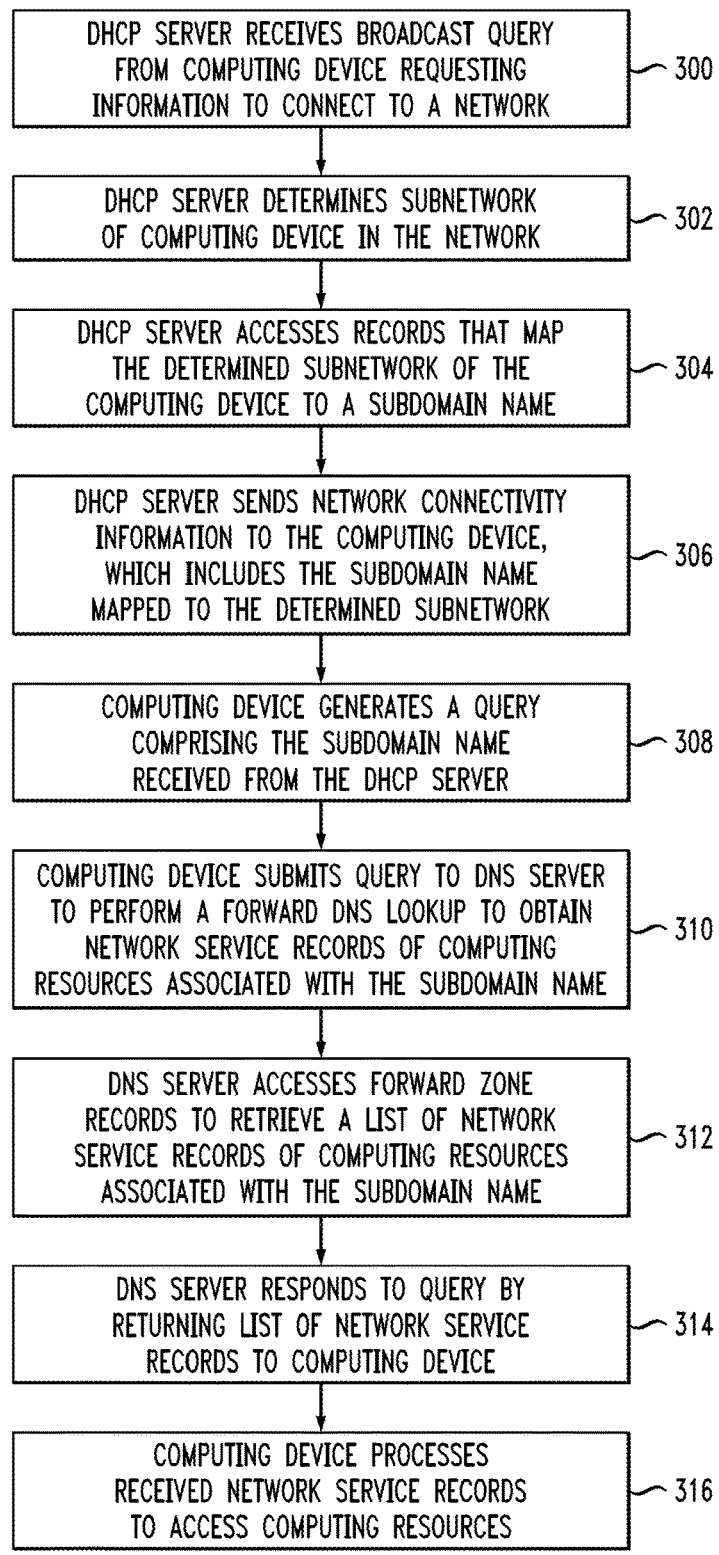
FIG. 3 is a flow diagram of a method for providing location-based network service discovery according to another embodiment of the invention.

FIG. 3 is a flow diagram of a method for providing location-based network service discovery according to another embodiment of the invention. In particular, FIG. 3 illustrates method for providing location-based network service discovery in which a computing device uses a subdomain name assigned by the DHCP server 120 to query the DNS server 110 to obtain a geo-specific list of resource records that are mapped to the assigned subdomain name. For purposes of illustration, assume once again that a user of the computing device 142 is seeking access to the computer network 130 and, in particular, the first subnetwork 140. Referring to FIG. 3, when the computing device 142 first connects to the network 130, a DHCP client of the computing device 142 will send a broadcast query requesting network connectivity information to the DHCP server 120. When the DHCP server 120 receives the request from the computing device 142 (block 300), the DHCP server 120 determines the subnetwork in which the computing device 142 is located in the computer network (block 302). The DHCP server 120 accesses the mapping records database 124 to identify one or more custom subdomain names that are mapped to the given subnetwork (block 304).

As noted above, the mapping records database 124 of the DHCP server 120 comprises records that logically map a given subnetwork to one or more subdomain names (custom DNS zones) that correspond to the determined location (subnetwork) of the computing device. In the current example, the DHCP server 120 may determine that the computing device 142 is in subset 10.2.3.0/24, which corresponds to the first subnetwork 140 (location1.company.com) of the computer network 130 (company.com). Under conventional protocols, the DHCP server 120 would typically assign IP address information to the computing device and assign the domain name of company.com of the parent computer network 130. In accordance with an embodiment of the invention, the DHCP server 120 would instead assign the computing device a subdomain name of location1.company.com representing the first subnetwork 140. In other embodiments, the DHCP server 120 could assign multiple domains and/or subdomain names to the computing device 142 based on the determined location, e.g., company.com (computer network 130), location1.company.com (first subnetwork 140), location2.company.com (second subnetwork 150), and/or a subdomain of the first subnetwork such as room1.location1.company.com, etc. The one or more subdomain names assigned by the DHCP server 120 are used by the computing device 142 as search domains for network resources using forward DNS lookup queries, as described herein.

Once the appropriate subdomain names are identified, the DHCP server 120 will send network connectivity information to the computing device 142, wherein the network connectivity information comprises the one or more subdomain names associated with the determined subnetwork, as well as other conventional IP configuration information as discussed above (block 306). Once the computing device implements the configuration settings, the computing device is able to communicate on the computer network 130.

Next, the computing device 142 will generate a query that comprises at least one subdomain name received from the DHCP server 120 (block 308). The computing device 142 submits the query to the DNS server 110 to perform a forward DNS lookup to obtain network service records of computing resources that are associated with the given subdomain name (block 310). In response to the query, the DNS server 110 accesses the database of forward zone records 113 to retrieve a list of network service records from the records database 114 for computing resources that are associated with the given subdomain name (block 312). As discussed above, the forward zone records database 113 includes a plurality of forward zone records that map custom subdomain names to list of one or more custom resource records in the records database 114 that are associated with the subdomains names. Once a forward zone record corresponding to the custom subdomain name is found, the DNS lookup module 111 will obtain list of one or more custom DNS resource records from the records database 114, which are specified as child records within the "list definition" portion of the forward zone record, as discussed above.

Thereafter, the DNS server 110 responds the query by returning the list of network service records to the computing device 142 (block 314). The computing device 142 will then process the received network service records to access or more shared computing resources that are identified in the returned list of network service records, as desired (block 316).

Figure 4:
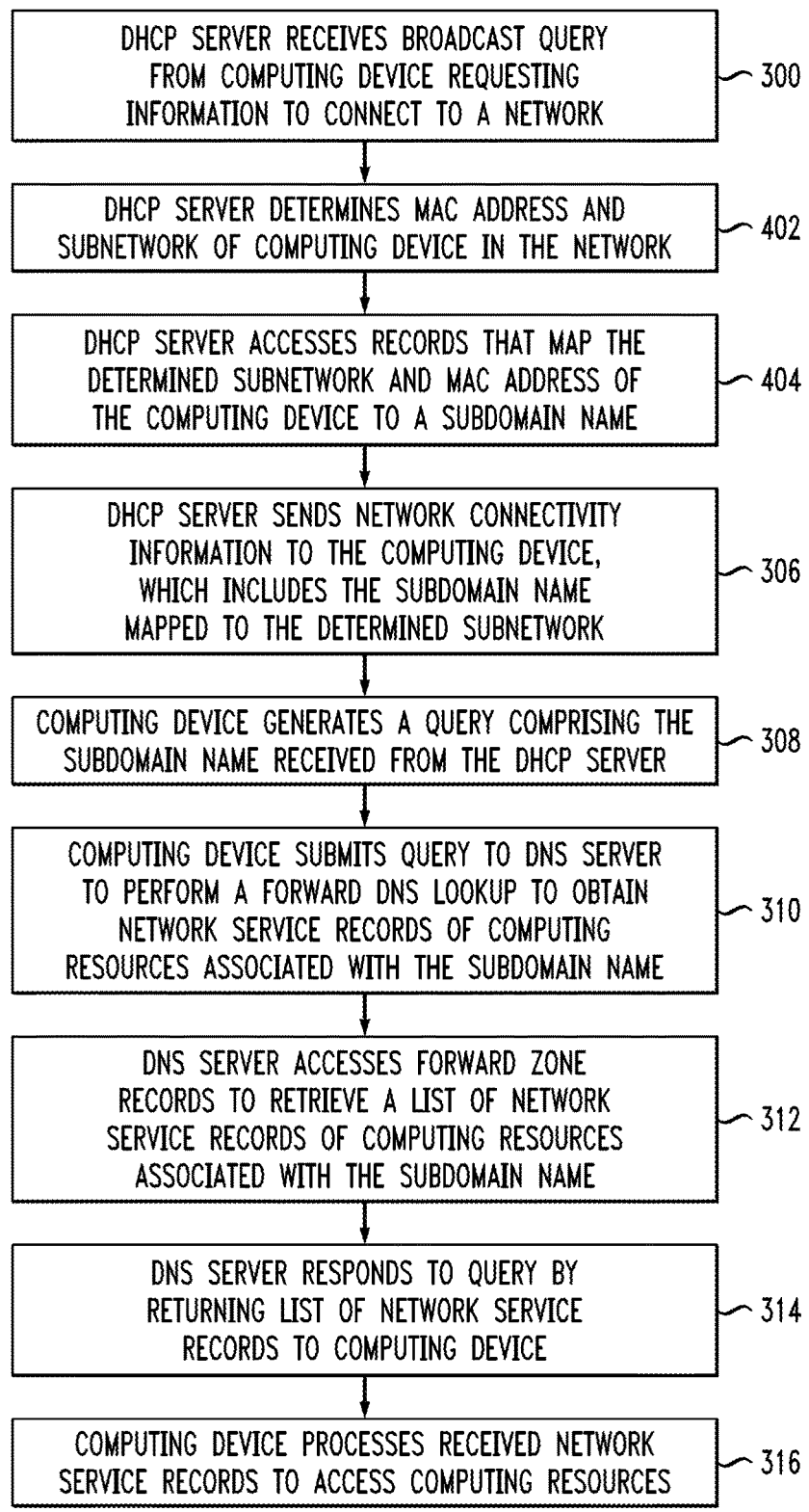
FIG. 4 is a flow diagram of a method for providing location-based network service discovery according to another embodiment of the invention.

FIG. 4 is a flow diagram of a method for providing location-based network service discovery according to yet another embodiment of the invention. In particular, FIG. 4 illustrates a method which is similar to the method of FIG. 3 for providing location-based network service discovery based on subdomains names assigned by the DHCP server 120, but wherein the DHCP server 120 assigns one or more subdomains based on knowledge of the subnetwork location of the computing device as well as a MAC address of the computing device. In particular, the flow diagram of FIG. 4 is similar to the flow diagram of FIG. 3 except for blocks 402 and 404 shown in FIG. 4.

In block 402, the DHCP server 120 determines the MAC address of the computing device 142 as well as the subnetwork to which the computing device 142 is connected in the computer network. In block 404, the DHCP server 120 accesses the mapping records database 124 to identify one or more subdomain names that are mapped to the given MAC address or a combination of the MAC address and determined subnetwork. The method of FIG. 4 provides additional granularity in the assignment of the subdomain names. Besides having knowledge of the subnet of the computing device, the DHCP server 120 also knows the MAC address of the computing device, which uniquely identifies the computing device. This allows the DHCP server 120 to assign subdomains not only a per-location basis, but a per-user custom domain basis based on the unique MAC address of the user's computing device.

For example, a given user (user1) could register his/her computing device in the mapping records database 124 of the DHCP server 120 so that the DHCP server 120 has knowledge of the MAC address (e.g., 00:11:22:33:44:55) of the user's computing device. In addition, based on user preferences, user-customized subdomains can be defined for the given user in the mapping records database 124 and mapped to the MAC address of the user's computing device, as well as to one or more geo-locations. In this manner, one or more user-customized subdomains, such as user1.location1.company.com and user1.location2.company.com, can be defined to provide personalized search domains for the user. For example, the personalized subdomain user1.location1.company.com can be defined and mapped to a subset of resource records of computing resources within the first subnetwork 140 that are of specific interest to the user. Similarly, the personalized subdomain user1.location2.company.com can be defined and mapped to a subset of resource records of computing resources within the second subnetwork 150 that are of specific interest to the user. When the user connects a given one of the first or second subnetworks 140 or 150, the DHCP server 120 can return a user-customized search subdomain name based on the registered MAC address and location of the user's computing device, to enable the user to access information on computing resources in the given subnet (or subnets) that are of interest to the user.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-4, the diagrams in the figures illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 5:
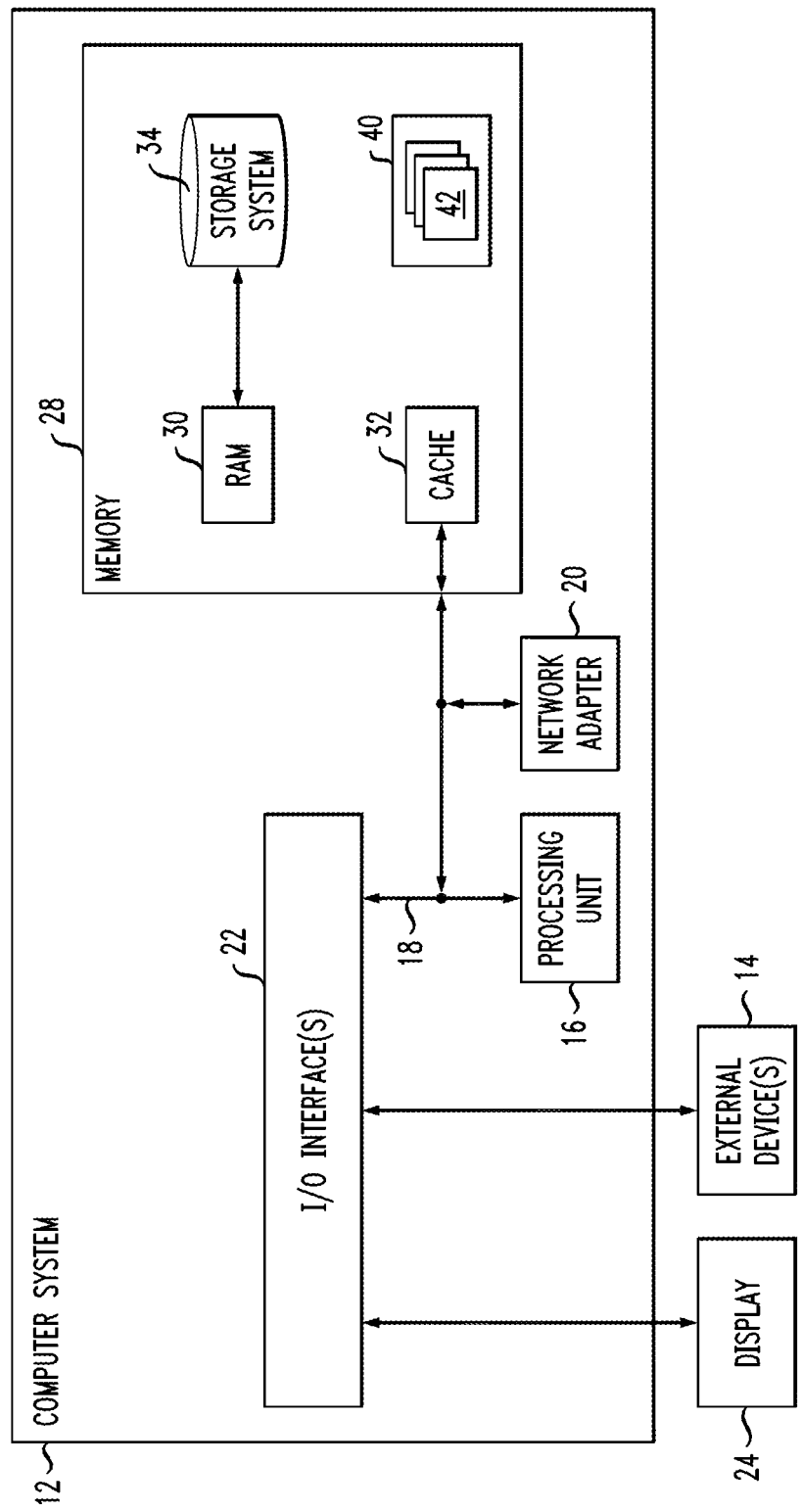
FIG. 5 illustrates a computer system that may be used to implement one or more components/steps of the techniques of the invention, according to an embodiment of the invention.

One or more embodiments can make use of software running on a general-purpose computer or workstation. With reference to FIG. 5, in a computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention. The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a server machine comprising a memory to store program instructions, and a processor wherein the processor executes the program instructions to instantiate a Dynamic Host Configuration Protocol (DHCP) server, wherein the DHCP server is configured to:
receive a broadcast query from a computing device requesting information to connect to a computer network;
determine a subnetwork of the computer network in which the computing device is located;
access a database of records that map each subnetwork within the computer network to one or more custom subdomain names, and search the database of records to determine a custom subdomain name that is mapped to the determined subnetwork of the computer network in which the computing device is located; and
send network connectivity information to the computing device, wherein the network connectivity information comprises an IP address assigned to the computing device and the custom subdomain name that is mapped to the determined subnetwork of the computer network in which the computing device is located;
wherein the computing device is configured to:
submit to a central Domain Name System (DNS) server, the custom subdomain name in a forward DNS lookup query to obtain network service records of computing resources that are associated with the custom subdomain name;
receive one or more network service records from the central DNS server; and
process the one or more received network service records to access one or more computing resources associated with the custom subdomain name; and
wherein the central DNS server maintains custom forward zone records, wherein each custom forward zone record associates at least one custom subdomain name with a list of one or more network service records of computing resources.

2. A system, comprising:
a server machine comprising a memory to store program instructions, and a processor, wherein the processor executes the program instructions to instantiate a Dynamic Host Configuration Protocol (DHCP) server, wherein the DHCP server is configured to:
receive a broadcast query from a computing device requesting information to connect to a computer network;
determine a subnetwork of the computer network in which the computing device is located;
determine a Machine Access Control (MAC) address of the computing device;
access a database of records that map each subnetwork within the computer network to one or more custom subdomain names, and search the database of records to determine a custom subdomain name that is mapped to the determined MAC address and the determined subnetwork of the computer network in which the computing device is located; and
send network connectivity information to the computing device, wherein the network connectivity information comprises an IP address assigned to the computing device and the custom subdomain name that is mapped to the determined MAC address and the determined subnetwork of the computer network in which the computing device is located;
wherein the computing device is configured to:
submit to a central Domain Name System (DNS) server, the custom subdomain name in a forward DNS lookup query to obtain network service records of computing resources that are associated with the custom subdomain name:
receive one or more network service records from the central DNS server; and
process the one or more received network service records to access one or more computing resources associated with the custom subdomain name;
wherein the central DNS server maintains custom forward zone records, wherein each custom forward zone record associates at least one custom subdomain name with a list of one or more network service records of computing resources.

3. The system of claim 2, wherein the custom subdomain name comprises a user-customized subdomain of a user, which maps to a subset of resource records of computing resources that are of interest to the user within the determined subnetwork of the computer network in which the computing device is located.

4. A system, comprising:
a server machine comprising a memory to store program instructions, and a processor wherein the processor executes the program instructions to instantiate a Dynamic Host Configuration Protocol (DHCP) server, wherein the DHCP server is configured to:
receive a broadcast query from a computing device requesting information to connect to a computer network;
determine a subnetwork of the computer network in which the computing device is located;
access a database of records that map each subnetwork within the computer network to one or more custom subdomain names, and search the database of records to determine a custom subdomain name that is mapped to the determined subnetwork of the computer network in which the computing device is located; and
send network connectivity information to the computing device, wherein the network connectivity information comprises an IP address assigned to the computing device and the custom subdomain name that is mapped to the determined subnetwork of the computer network in which the computing device is located;
wherein the computing device is configured to:
generate a forward Domain Name System (DNS) lookup query for network service records, the query comprising the custom subdomain name that is mapped to the determined subnetwork of the computer network in which the computing device is located;
submit the query to a central DNS server which maintains a database of custom network service records of computing resources that are available in different subnetworks of the computer network and a database of custom forward zone records of the different subnetworks of the computer network, wherein each of the custom network service records comprises a custom, text-type DNS resource record that describes custom attributes of a corresponding computing resource, wherein the custom attributes comprise operating characteristics and capabilities of the corresponding computing resource, and wherein each of the custom forward zone records associates a custom subdomain name of a subnetwork in the computer network with a list of one or more custom network service records of computing resources that are available in the subnetwork of the computer network;
receive a list of one or more custom network service records of computing resources that are available in the determined subnetwork of the computer network in which the computing device is located from the central DNS server in response to said query; and
process the received list of one or more custom network service records to access the one or more computing resources that are available in the determined subnetwork of the computer network in which the computing device is located;
wherein the central DNS server accesses a custom forward zone record of the determined subnetwork of the computer network in which the computing device is located using the custom subdomain name in the query and retrieves the list of one or more custom network service records of computing resources that are available in the determined subnetwork of the computer network in which the computing device is located.

5. A system, comprising:
a server machine comprising a memory to store program instructions, and a processor, wherein the processor executes the program instructions to instantiate a Dynamic Host Configuration Protocol (DHCP) server, wherein the DHCP server is configured to:
receive a broadcast query from a computing device requesting information to connect to a network;
determine a subnetwork of the computer network in which the computing device is located;
determine a Machine Access Control (MAC) address of the computing device;
access a database of records that map each subnetwork within the network to one or more custom subdomain names, and search the database of records to determine a custom subdomain name that is mapped to the determined MAC address and the determined subnetwork of the computer network in which the computing device is located; and
send network connectivity information to the computing device, wherein the network connectivity information comprises an IP address assigned to the computing device and the custom subdomain name that is mapped to the determined MAC address and the determined subnetwork of the computer network in which the computing device is located;
wherein the computing device is configured to:
generate a forward Domain Name System (DNS) lookup query for network service records, the query comprising the custom subdomain name that is mapped to the determined subnetwork of the computer network in which the computing device is located;
submit the query to a central DNS server which maintains a database of custom network service records of computing resources that are available in different subnetworks of the computer network and a database of custom forward zone records of the different subnetworks of the computer network, wherein each of the custom network service records comprises a custom, text-type DNS resource record that describes custom attributes of a corresponding computing resource, wherein the custom attributes comprise operating characteristics and capabilities of the corresponding computing resource, and wherein each of the custom forward zone records associates a custom subdomain name of a subnetwork in the computer network with a list of one or more custom network service records of computing resources that are available in the subnetwork of the computer network;

receive a list of one or more custom network service records of computing resources that are available in the determined subnetwork of the computer network in which the computing device is located from the central DNS server in response to said query; and process the received list of one or more custom network service records to access the one or more computing resources that are available in the determined subnetwork of the computer network in which the computing device is located;

wherein the central DNS server accesses a custom forward zone record of the determined subnetwork of the computer network in which the computing device is located using the custom subdomain name in the query and retrieves the list of one or more custom network service records of computing resources that are available in the determined subnetwork of the computer network in which the computing device is located.

6. A computing device, comprising:

a memory to store program instructions, and a processor, wherein the processor executes the program instructions to configure the computing device to perform a method which comprises:

sending, by the computing device, a broadcast query to a Dynamic Host Configuration Protocol (DHCP) server, the broadcast query requesting information to connect to a computer network, wherein the DHCP server is configured to (i) determine a subnetwork of the computer network in which the computing device is located, (ii) access a database of records that map each subnetwork within the computer network to one or more custom subdomain names, and (iii) search the database of records to determine a custom subdomain name that is mapped to the determined subnetwork of the computer network in which the computing device is located;

receiving, by the computing device, network connectivity information from the DHCP server, wherein the network connectivity information comprises an IP address assigned to the computing device and the custom subdomain name that is mapped to the determined subnetwork of the computer network in which the computing device is located;

generating, by the computing device, a forward Domain Name System (DNS) lookup query for network service records, the query comprising the custom subdomain name that is mapped to the determined subnetwork of the computer network in which the computing device is located;

submitting, by the computing device, the query to a central DNS server which maintains a database of custom network service records of computing resources that are available in different subnetworks of the computer network and a database of custom forward zone records of the different subnetworks of the computer network, wherein each of the custom network service records comprises a custom, text-type DNS resource record that describes custom attributes of a corresponding computing resource, wherein the custom attributes comprise operating characteristics and capabilities of the corresponding computing resource, and wherein each of the custom forward zone records associates a custom subdomain name of a subnetwork in the computer network with a list of one or more custom network service records of computing resources that are available in the subnetwork of the computer network;

wherein the central DNS server is configured to access a custom forward zone record of the determined subnetwork of the computer network in which the computing device is located using the custom subdomain name in the query and retrieve the list of one or more custom network service records of computing resources that are available in the determined subnetwork of the computer network in which the computing device is located;

receiving, by the computing device, a list of one or more custom network service records of computing resources that are available in the determined subnetwork of the computer network in which the computing device is located from the central DNS server in response to said query; and processing, by the computing device, the received list of one or more custom network service records to access the one or more computing resources that are available in the determined subnetwork of the computer network in which the computing device is located.

* * * * *